Figure 1:
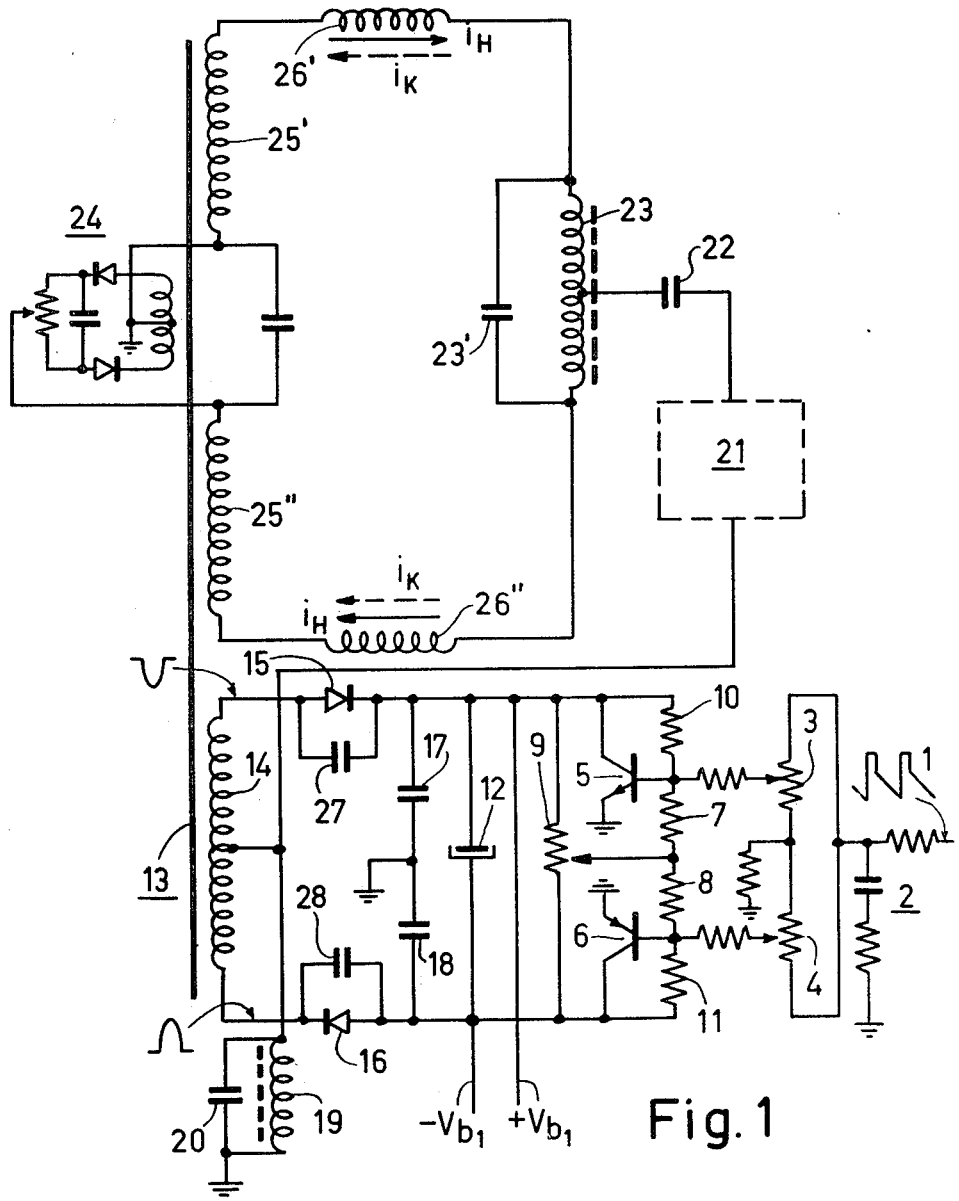

United States Patent [19]
Boekhorst

[11] B 3,988,637
[45] Oct. 26, 1976

[54] CIRCUIT ARRANGEMENT FOR GENERATING IN A PICTURE DISPLAY DEVICE A SAWTOOTH CURRENT OF LINE FREQUENCY HAVING AN AMPLITUDE VARYING AT FIELD FREQUENCY

[75] Inventor: Antonius Boekhorst, Eindhoven, Netherlands

[73] Assignee: U.S. Philips Corporation, New York, N.Y.

[22] Filed: June 27, 1974

[21] Appl. No.: 483,615

[44] Published under the second Trial Voluntary Protest Program on January 27, 1976 as document No. B 483,615.

Related U.S. Application Data
[63] Continuation of Ser. No. 40,830, May 27, 1970.

[30] Foreign Application Priority Data
May 29, 1969 Netherlands.................... 6908229

[52] U.S. Cl................................ 315/371; 315/393
[51] Int. Cl.²........................................ H01J 29/56
[58] Field of Search.......................... 315/371, 393

[56] References Cited
UNITED STATES PATENTS

| | | | |
|---|---|---|---|
| 2,649,555 | 8/1953 | Lockhart | 315/371 |
| 3,320,469 | 5/1967 | Slavik | 315/371 |
| 3,440,483 | 4/1969 | Kaashoek et al. | 315/13 |

Primary Examiner—Richard A. Farley
Assistant Examiner—S. C. Buczinski
Attorney, Agent, or Firm—Frank R. Trifari; Henry I. Steckler

[57] ABSTRACT

A circuit arrangement for generating in a color picture display device a sawtooth correction current of line frequency flowing through the line deflection coils and having an amplitude varying at field frequency for the purpose of obtaining a better color superposition in the corners of the screen of the display tube. The circuit arrangement is provided with a modulator which includes an electronic switch switching at the line frequency, which connects a field generator to a resonant circuit during the line scan period, which resonant circuit includes in a parallel arrangement a capacitor and an inductance including the line deflection coil, the period of the resonant frequency of the resonant circuit being substantially twice the line flyback period. The electronic switch is formed by means of two diodes which are blocked during the line flyback period and which generate supply voltages for the amplifier controlling the modulator and for other parts of the display device so that the load on the field deflection generator is very small.

10 Claims, 6 Drawing Figures

INVENTOR.
ANTONIUS BOEKHORST

CIRCUIT ARRANGEMENT FOR GENERATING IN A PICTURE DISPLAY DEVICE A SAWTOOTH CURRENT OF LINE FREQUENCY HAVING AN AMPLITUDE VARYING AT FIELD FREQUENCY

This is a continuation of application Ser. No. 40,830, filed May 27, 1970.

The invention relates to a circuit arrangement for generating in a picture display device a sawtooth correction current of line frequency having an amplitude varying at field frequency. The picture display device is provided with a line and a field deflection current generator for applying a sawtooth current of line and field frequency and having a substantially constant peak-to-peak amplitude to a line and field deflection coil: The device also has a modulator controlled by the field deflection generator for obtaining the amplitude variation of field frequency of the sawtooth correction current of line frequency: The said sawtooth correction current of line frequency is proportional to the instantaneous value of the line deflection current and of the field deflection current. The modulator includes an electronic switch switching at the line frequency, which connects the field deflection generator to a resonant circuit during the line scan period. The resonant circuit includes in a parallel arrangement a capacitor and an inductance including the line deflection coil, the period of the resonant frequency of the resonant circuit being substantially twice the line flyback period and the electronic switch being formed by means of two diodes.

U.S. Pat. No. 3,697,801 describes a modulator which is used in a display device for colour television for the purpose of generating a sawtooth correction current of line frequency having an amplitude varying at field frequency. From the beginning to the end of the scan of a field period, this correction current of line frequency is to decrease from a given value to zero in a substantially linear manner whereafter a substantially equal increase in the reverse current direction follows. This correction current is superimposed on the deflection current flowing in the line deflection coil., the peak-to-peak amplitude of which current is substantially constant. Since the deflection coil is divided into two coil halves which are arranged substantially symmetrically on either side of the neck of the display tube, it is possible to add the correction current in one coil half to the deflection current and to substract it in the other coil half. The magnetic deflection field of one coil half will therefore be enlarged and that of the other coil half will be reduced to a substantially equal extent.

As is known the so-called anisotropic astigmatism of a deflection coil causes a distortion in which an electron beam having a circular or elliptical cross-section acquires a tilted ellipse shape, which distortion is dependent on the extent of deflection. In other words this distortion occurs most seriously in the corners of the picture displayed and it results in colour superposition errors. Now it is possible to eliminate this distortion with the aid of an oppositely directed distortion caused by the above-mentioned correction current.

The said amplitude variation of field frequency of the sawtooth current of line frequency is established by means of a modulator controlled by the field deflection current generator. The said patent application described a modulator which includes an electronic switch switching at the line frequency which applies a voltage provided by the field generator to a resonant circuit during the line scan period, the period of the resonant frequency of the resonant circuit being substantially twice the line flyback period.

In the modulation described, the information of field frequency is derived by means of an additional winding on the field output transformer and is subsequently applied to the said electronic switch. This constitutes quite a considerable load for the field output transformer so that it becomes necessary to form this field output transformer as a low-resistive source which causes a great dissipation. In addition a field output transformer may not occur at all in transistorized picture display devices. Such a circuit arrangement is described, for example, in U.S. Pat. No. 3,434,004. An object of the present invention is to provide a modulator for which a field output transformer is not required, or if such a transformer might be present, the modulator would cause a comparatively slight load thereon.

The invention is based on the recognition of the fact that the diodes which are present in the modulator may alternatively be used for generating supply voltages and to this end the circuit arrangement according to the invention is characterized in that the modulator is controlled by an amplifier which is provided with supply voltages due to the said diodes rectifying the peak amplitude during the line scan period of line pulses.

In this manner the diodes in the modulator function as switching diodes for the modulator for generating the correction current and also as rectifiers for generating supply voltages for use of the amplifier controlling the modulator. As a result, a supply source from elsewhere is not necessary. In addition it is to be noted that these supply voltages may alternatively be used by other parts of the picture display device and the invention is based on the recognition of the fact that a great load on these supply voltaes is even favourable for a satisfactory operation of the modulator.

Figure 2:
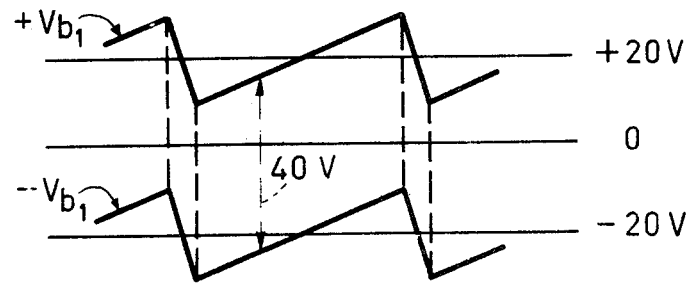
Figure 3:
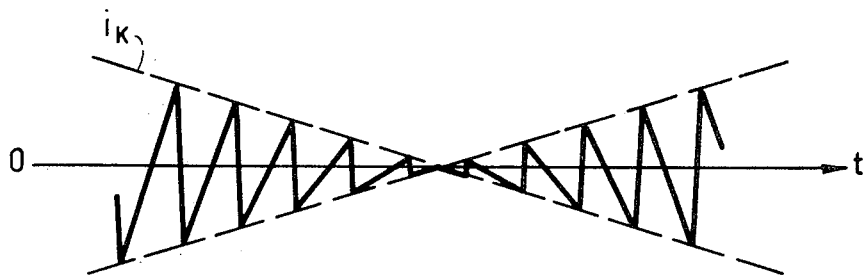

In order that the invention may be readily carried into effect, a few embodiments thereof will now be described in detail by way of example, with reference to the accompanying diagrammatic drawings, in which FIG. 1 shows a circuit arrangement according to the invention, while FIGS. 2 and 3 show two voltage waveforms and a current waveform occurring in the circuit arrangement according to FIG. 1.

Figure 4:
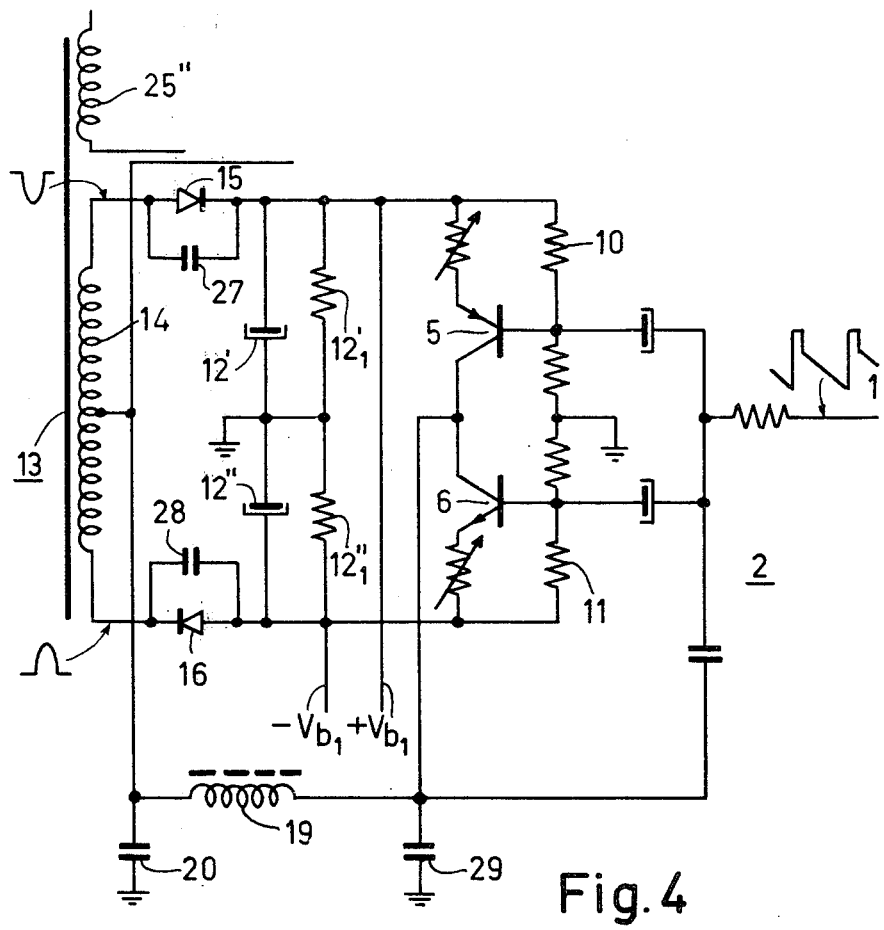
Figure 5:
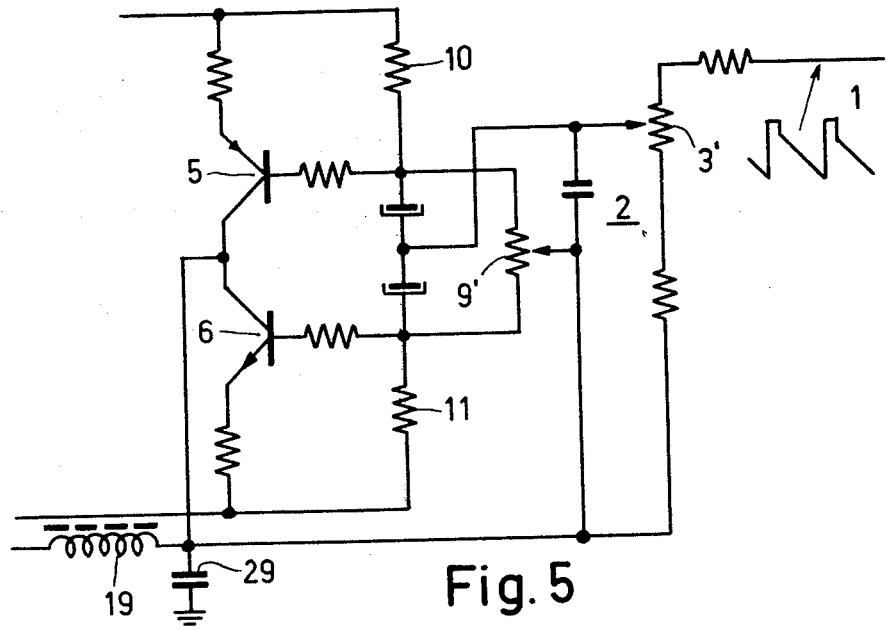
Figure 6:
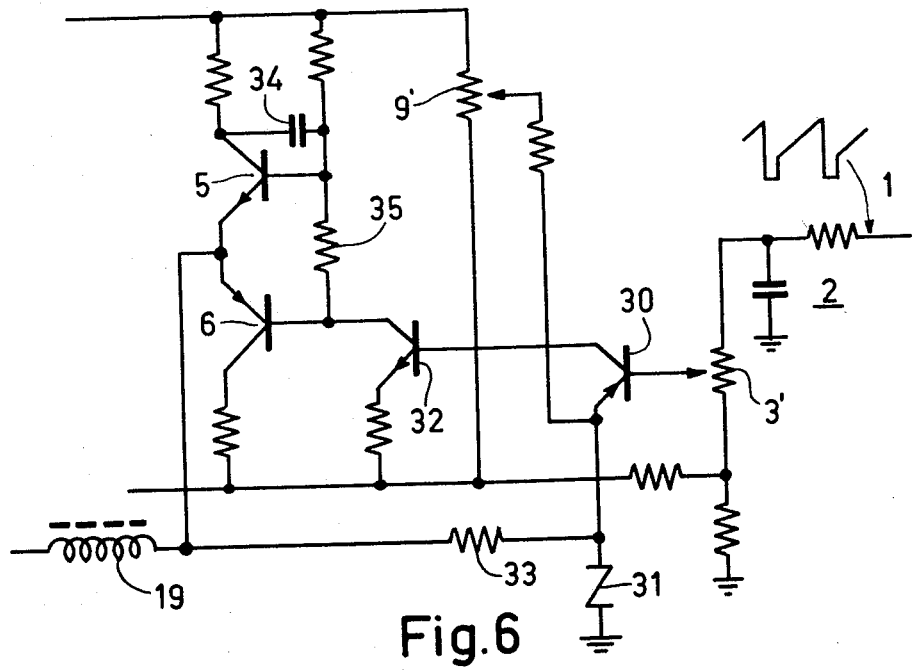

FIGS. 4, 5 and 6 show details of a few modifications of the embodiment of FIG. 1.

FIG. 1 shows an embodiment of the circuit arrangement according to the invention. The voltage 1 originating from the field output generator is integrated by means of a network 2 consisting of a resistor and a capacitor in order to eliminate voltage peaks occurring in voltage 1. The substantially sawtooth voltage then obtained is applied through two potentiometers 3 and 4 to an amplifier which in this embodiment comprises a complementary pair of two transistors 5 and 6. These transistors are fed by means of a positive voltage $+V_{b1}$ and a negative voltage $-V_{b1}$. The bases of transistors 5 and 6 are connected through two resistors 7 and 8 to the wiper on a potentiometer 9 which is arranged between the supply voltages $+V_{b1}$ and $-V_{b1}$ and through resistors 10 and 11 to the collectors, while the emitters of both transistors 5 and 6 are connected to ground. Furthermore, potentiometer 9 is shunted by an electrolytic capacitor 12 of high capacitance while the collectors of transistors 5 and 6 are connected to the common ends of elements 9 and 12, which are the supply lines $+V_{b1}$ and $-V_{b1}$ respectively. Thus the entire circuit arrangement which is shown to the left of transistors 5 and 6 in FIG. 1 constitutes the collector load for said transistors.

A winding 14 is wound on the line output transformer 13 and two diodes 15 and 16 are arranged between the ends of this winding and the lines $+V_{b1}$ and $-V_{b1}$ respectively, The direction of conductivity of these diodes has been chosen to be such that the line flyback pulses which are produced at the ends of winding 14 block these diodes. Points $+V_{b1}$ and $-V_{b1}$ are connected to ground by means of two capacitors 17 and 18 whose capacitances have been chosen in such a manner that the lines $+V_{b1}$ and $-V_{b1}$ do not contain substantial component of line frequency, but which have too low a capacitance to be considered a short circuit for the field frequency. Since diode 15 conducts during the line scan period for a given time ("opening angle" of the diode functioning as a peak rectifier), a positive voltage would be produced at its cathode, that is to say, at the point $+V_{b1}$ if the amplifier 5, 6 were not present, while a negative voltage would be produced in a corresponding manner at the anode of diode 16. Due to the presence of amplifier 5,6 sawtooth voltages of field frequency are superimposed on the said direct voltage as is shown in FIG. 2. In a practical embodiment of the circuit arrangement according to FIG. 1 wherein the line flyback pulses had a peak amplitude of 170V the mean direct voltage on point $+V_{b1}$ was +20V and on point $-V_{b1}$ it was −20V so that the instantaneous diifference between the two mentioned sawtooth voltages was always 40V. The supply voltages generated in this manner then serve as supply voltage source for the transistors 5 and 6 and may also be used in other parts of the picture display device which are not hampered by the sawtooth voltages of field frequency shown in FIG. 2. Such a part is, for example, a correction circuit for the North-South pincushion distortion.

Winding 14 on line output transformer 13 has a center top which at one end is connected to ground through a choke coil 19 and a capacitor 20 and at the other and is connected through a circuit 21 and a capacitor 22 to the center top on a coil 23. Coil 23 forms part of the line deflection circuit and is shunted by a capacitor 23'. The said line deflection circuit constitutes a closed circuit shown in a simplified form in the Figure which comprises: inter alia, two substantially identical secondary windings 25' and 25" on line output transformer 13, the two line deflection coil halves 26' and 26" series-arranged in this embodiment as well the elements 23 and 23' already mentioned. The line deflection current generator not shown in the Figure which is provided on the primary side of line output transformer 13 produces a sawtooth line deflection current $i_H$ in this closed circuit. A variable direct current also flows through said circuit in order to be able to horizontally center the picture displayed, which current is produced in known manner by circuit 24. Capacitor 23' serves for the so-called S-correction and could have been split in two in order to create a center tap. However, coil 23 provides a path for the centering direct current produced by circuit 24.

The configuration 23 to 26" inclusive described has for its object to effect a satisfactory symmetry in the circuit arrangement so that both correction currents $i_k$ which flow through coils 26' and 26" are substantially equal in absolute value and have a direction which is shown by arrows in FIG. 1. The Figure shows that the correction current $i_k$ in deflection coil 26' is added to the deflection current $i_H$ while it is substracted in coil 26". Since the said closed circuit is a bridge circuit, the line deflection current generator not shown in FIG. 1 which is connected to the primary side of transformer 1 and the modulator which produces correction current $i_k$ cannot influence each other.

Choke coil 19 which has a high inductance provides a path to ground for the collector current of transistors 5 and 6 while capacitor 20 constitutes a resonant circuit together with the line deflection circuit so that the period of the resonant frequency thereof is substantially twice the line flyback period. Since diodes 15 and 16 are blocked during the line flyback period, these diodes function as an electronic switch so that a pulsatory voltage of line frequency is produced at the center top on winding 14, which voltage is modulated by a sawtooth voltage of field frequency. The operation of the modulator is the same as that of the modulator described in the said U.S. Pat. No. 3,697,801 with this difference, however, that one of the diodes is reversed relative thereto.

The current which is produced by the modulator described in FIG. 1 would have a shape as is shown in FIG. 3 if circuit 21 were not present. As has been stated U.S. Pat. No. 3,748,531 the correction current flowing through the line deflection coils must not only be proportional to the instantaneous value of the line deflection current and of the field deflection current, but it must also include an additional correction current which flows in the same direction as the said correction current and which is proportional to the third power of the line deflection current. Circuit 21 has for its object to produce this additional correction current and it is described in the previously mentioned U.S. Pat. No. 3,748,531 Capacitor 22 which has a high capacitance and DC-separates the line deflection circuit from the modulator, which is necessary since the centering direct current also flows through the line deflection coil halves 26' and 26".

The correction current for the upper and the lower portions of the picture can be adjusted separately by means of potentiometers 3 and 4, while potentiometer 9 renders a symmetry control possible. In fact, the zero crossing of the envelope of the correction current of FIG. 3 can be shifted by means of this potentiometer 9 so as to take tolerances in the different elements of the picture display device into account. Thus an adjustment of the central horizontal line is obtained therewith. Since the input impedance of the amplifier described is high for the sawtooth voltage of field frequency, it does not cause any noticeable load on the field output generator so that it can be formed optionally with or without an output transformer, which may be considered to be an advantage of the circuit arrangement according to the invention.

As has been stated diodes 15 and 16 function as switching diodes for the modulator described and also as rectifiers for generating the supply voltages for the said amplifier and other parts of the picture display device. A condition for a satisfactory functioning of this circuit is that line flyback pulses present at the ends of winding 14 do not contain modulation which would, for example, originate from an East-West field correction circuit or do not contain any parabola component which might be caused by too small a booster capacitor in the line deflection generator. Since capacitor 12 has a high value, so that the voltage between $+V_{b1}$ and $-V_{b1}$ is substantially constant, diodes 15 and 16 could not conduct at all over a number of line scan periods when the amplitude of the line flyback pulses decreases so that a modulator action of diodes 15 and 16 would be impossible. If the line deflection generator of the picture display device wherein the circuit arrangement according to the invention is used comprises two generators as described in U.S. Pat. No. 3,691,422, winding 14 must therefore be wound on the transformer of the main line output transformer which is not East-West modulated. It is true that this main generator is not stabilised against variations in the power mains voltage, but due to the smoothing capacitors of high value in the supply of the picture display device these variations are much slower than those which are caused by the East-West correction and therefore can be followed by capacitor 12.

In addition it is desirable that the load current provided by this supply is high, for the higher this current the larger the opening angle of the diodes and the better the modulator functions. It is true that the opening angle of the diodes might be enlarged by connecting, for example, resistors in series therewith so that all variations in the amplitude of the line flyback pulses would be admitted, but this would have the drawback that the dissipation would be uselessly increased and that the modulator would have a resistive internal impedance which is undesirable because the load thereof is inductive.

Diodes 15 and 16 are shunted by two capacitors 27 and 28 of comparatively low capacitance ( in the order of 330 pF) which have for their object to decrease the frequency of possible RF interferences which may be caused by the steep edges of the switching currents flowing through the diodes.

FIG. 4 shows a further embodiment of the circuit arrangement according to the invention. In this Figure capacitor 12 is replaced by two equal series-arranged capacitors of high capacitance 12' and 12" the common point of which is connected to ground and which are shunted by two equal resistors $12'_1$ and $12''_1$ respectively. Due to this step capacitors 17 and 18 need not be present and the supply voltages $+V_{b1}$ and $-V_{b1}$ pure direct voltages. Resistors $12_1'$ and $12_1''$ ensure that these supply voltages are equal in absolute value. As a result the supply described becomes suitable for more parts of the picture display device which as has been stated is favourable for a satisfactory operation of the modulator. In FIG. 4 the base direct voltages of transistors 5 and 6 are maintained constant and the amplification of these transistors is adjusted by means of variable emitter resistors. The collectors of both transistors are connected together and control a sawtooth current of field frequency flowing through choke coil 19 which is now arranged between the junction of these collectors and the center tap on winding 14. The same junction of both collectors is connected to ground with respect to voltages of line frequency by means of capacitor 29. In the embodiment of FIG. 4, the capacitor in the integrating network 2 is connected to the common point of the collectors of transistors 5 and 6, which is a negative feedback in order to improve the linearity of the obtained sawtooth after the integration by means of network 2 has resulted in a given rounding-off of the sawtooth voltage.

In the embodiment of the circuit arrangement shown in FIG. 5 according to the invention an amplitude control device 3' and a symmetry control device 9' are used for adjusting the sawtooth envelope of field frequency.

In the modification of FIG. 6 an amplification transistor 30 is used which has a voltage-dependent resistor 31 as its emitter resistor, while its emitter voltage can be adjusted by means of a potentiometer 9' arranged between the supply voltages $+V_{b1}$ and $-V_{b1}$. The voltage present on the collector of the transistor 30 controls a driver transistor 32, whereafter it is applied to a final amplifier comprising a complementary pair of transistors 5, 6. A negative feedback resistor 33 is arranged between the interconnected emitters of transistors 5 and 6 and the emitter of transistor 30. In order to prevent possible oscillations, a capacitor 34 which has a low value for the field frequency is arranged between collector and base of transistor 5. The base currents of these transistors can be adjusted by means of the resistor 35 of low value which is arranged between the bases of transistors 5 and 6 so as to ensure that one transistor still conducts to a slight extent at the instant when the other starts to conduct. Voltage-dependent resistor 31 is provided in the negative feedback loop in order to obtain a non-linear envelope of the sawtooth correction current of line frequency. All this has been described in U.S. Pat. No. 3,748,531.

The same is achieved by means of potentiometer 9' in FIG. 6 as by means of potentiometer 9' in FIG. 5, namely a symmetry control, that is to say, the adjustment of the central horizontal line.

In the described circuit arrangements according to the invention the line deflection coil halves were arranged in series. It is evident that the principle of the invention is not affected if these coil halves are arranged in parallel.

What is claimed is:

1. A circuit arrangement for generating in a picture display device a sawtooth deflection correction current of line frequency having an amplitude varying at field frequency, said circuit comprising a line deflection current generator and a field deflection current generator for applying sawtooth currents of line and field frequency and having a substantially constant peak-to-peak amplitude to line and field deflection coils respectively. a modulator means controlled by the field deflection generator for obtaining the amplitude variation of field frequency of the sawtooth correction current of line frequency, the said sawtooth correction current of line frequency being a function of the instantaneous value of the line deflection current and of the field deflection current, said modulator including an electronic switch switching at the line frequency, an inductive circuit including said line deflection coil, said switch coupling said field generator to said inductive circuit during the line scan period, a capacitor, a resonant circuit comprising said capacitor and said inductive circuit during the line flyback period, the period of the resonant frequency of the resonant circuit being substantially twice the line flyback period, said electronic switch comprising two oppositely poled diodes that also generate supply voltages, said circuit further comprising an amplifier having an input adapted to receive said field frequency signal and an output coupled to said modulator, and means for applying said supply voltages due to the said diodes rectifying the peak amplitude during the line scan period of line pulses to said amplifier.

2. A circuit arrangement as claimed in claim 1, wherein said diodes are blocked during the line flyback period.

3. A circuit as claimed in claim 1 further comprising at least one large value capacitor coupled between said diodes, whereby said supply voltages are stabilized.

4. A circuit as claimed in claim 3 further comprising a second large value capacitor coupled in series with said first capacitor, said capacitor being coupled between said diodes, the junction of said capacitors being grounded.

5. A circuit as claimed in claim 4 further comprising third and fourth series coupled capacitors coupled between said diodes, the junction of said third and fourth capacitors being grounded, said third and fourth capacitors having a low reactance for said line freqency and a high reactance for said field frequency.

6. A circuit as claimed in claim 1 further comprising means for supplying negative feedback within said amplifier, whereby said linearity is improved.

7. A circuit as claimed in claim 6 wherein said supplying means comprises a voltage dependent resistor coupled to said amplifier and an impedance element coupled between said voltage dependent resistor and said resonant circuit.

8. A circuit as claimed in claim 6 wherein said supplying means comprises an integrating circuit having an input adapted to receive said field frequency signal and an output coupled to said amplifier input and output.

9. A circuit as claimed in claim 1 further comprising means coupled to said amplifier for adjusting the amplitude of said correction current.

10. A circuit as claimed in claim 1 further comprising symmetry adjusting means coupled to said amplifier.

* * * * *